United States Patent
Adams et al.

(10) Patent No.: US 8,650,639 B2
(45) Date of Patent: Feb. 11, 2014

(54) SYSTEM AND METHOD FOR HINDERING A COLD BOOT ATTACK

(75) Inventors: Neil Patrick Adams, Kitchener (CA); Michael Stephen Brown, Kitchener (CA); Robert John Lambert, Cambridge (CA); Alfred John Menezes, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 239 days.

(21) Appl. No.: 12/893,522

(22) Filed: Sep. 29, 2010

(65) Prior Publication Data

US 2012/0079593 A1  Mar. 29, 2012

(51) Int. Cl.
*H04L 29/06* (2006.01)

(52) U.S. Cl.
USPC ............. 726/23; 713/189; 713/190; 713/193; 713/194

(58) Field of Classification Search
USPC ........................................................ 726/23
See application file for complete search history.

(56) References Cited

U.S. PATENT DOCUMENTS

| | | | |
|---|---|---|---|
| 5,027,397 A * | 6/1991 | Double et al. | 713/194 |
| 6,283,369 B1 * | 9/2001 | Kurokawa et al. | 235/380 |
| 6,330,668 B1 | 12/2001 | Curiger et al. | |
| 7,343,496 B1 * | 3/2008 | Hsiang et al. | 713/194 |
| 2006/0053306 A1 * | 3/2006 | Adams et al. | 713/190 |
| 2007/0160201 A1 * | 7/2007 | Blom et al. | 380/30 |
| 2007/0255966 A1 * | 11/2007 | Condorelli et al. | 713/194 |
| 2007/0266258 A1 * | 11/2007 | Brown et al. | 713/183 |
| 2007/0294529 A1 * | 12/2007 | Blair et al. | 713/160 |
| 2008/0034224 A1 * | 2/2008 | Ferren et al. | 713/193 |
| 2008/0069037 A1 * | 3/2008 | Zhang et al. | 370/328 |
| 2008/0212782 A1 * | 9/2008 | Brettle et al. | 380/277 |
| 2008/0222430 A1 * | 9/2008 | Buscaglia et al. | 713/194 |
| 2009/0144557 A1 * | 6/2009 | Sutton | 713/189 |
| 2010/0106289 A1 * | 4/2010 | Moh et al. | 700/227 |
| 2010/0241739 A1 | 9/2010 | Reus et al. | |

FOREIGN PATENT DOCUMENTS

| | | |
|---|---|---|
| EP | 0417447 A2 | 3/1991 |
| WO | 2009018125 A1 | 2/2009 |

OTHER PUBLICATIONS

Samyde et al., On a New Way to Read Data from Memory, Dec. 2002, IEEE Proceedings of the First International Security in Storage Workshop, pp. 65-69.*
Extended European Search Report; European Application No. 10182197.3; Mar. 24, 2011; 8 pages.
Gale, Doug; "Research Has Chilling Effect on Hard Drive Encryption"; Campus Technology; http://campustechnology.com/Articles/2008/03/Research-Has-Chilling-Effect-on-Hard-Drive-Encryption.aspx; Mar. 14, 2008, 3 pgs.
Halderman, Alex J. et al; "Lest We Remember: Cold Boot Attacks on Encryption Keys"; Proc. 2008 USENIX Security Symposium; Feb. 21, 2008; 16 pgs.
Canadian Office Action; Application No. 2,754,230; Oct. 25, 2013; 4 pages.

* cited by examiner

*Primary Examiner* — Morshed Mehedi
*Assistant Examiner* — Kenneth Chang
(74) *Attorney, Agent, or Firm* — Conley Rose, P.C.; J. Robert Brown, Jr.; Maria L. Sekul

(57) ABSTRACT

A method for hindering a cold boot attack on a user equipment (UE) is provided. The method includes, in response to detection of the cold boot attack, executing prioritized security procedures. A user equipment (UE) is also provided that includes a processor configured to execute prioritized security procedures responsive to detection of a cold boot attack.

15 Claims, 2 Drawing Sheets

SYSTEM AND METHOD FOR HINDERING A COLD BOOT ATTACK

BACKGROUND

As used herein, the terms "user equipment" and "UE" might in some cases refer to mobile devices such as mobile telephones, personal digital assistants, handheld or laptop computers, and similar devices that have telecommunications capabilities. Such a UE might consist of a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module. In other cases, the term "UE" might refer to devices that have similar capabilities but that are not easily transportable, such as desktop computers, set-top boxes, or network appliances. The term "UE" can also refer to any hardware or software component that can terminate a communication session for a user. Also, the terms "user equipment," "UE," "user agent," "UA," "user device" and "user node" might be used synonymously herein.

Cryptography (e.g., encryption) is commonly used today to protect against data theft. For example, a UE may use encryption in order to protect data stored on the UE. However, even with encryption, data on a UE is still vulnerable if an attacker gains access to the UE. Specifically, if an attacker steals the UE or if the UE is left unattended for a short period of time, the UE is susceptible to what is commonly called a cold boot attack.

A cold boot attack is a type of physical attack in which an attacker with physical access to a UE is able to retrieve encryption keys from the UE and unscramble the data after using a cold reboot to restart the UE from a completely off or a full power down state. The cold boot attack exploits a little known property of a Random Access Memory ("RAM"): a RAM can retain its contents for several seconds to minutes after the UE loses power. If the RAM is cooled prior to terminating power, the RAM can retain its contents for even longer (e.g., hours). A cold boot operation cools the RAM in the UE and reboots the UE.

To execute one such cold boot attack, the UE is cold booted, a light-weight operating system is then immediately booted (e.g., from a USB flash drive), and the contents of the pre-booted RAM are dumped to a file. Alternatively, the RAM is moved from the UE and quickly placed in another UE under the attacker's control, which is then booted to access the RAM. Further analysis can then be performed against information that was retrieved from the RAM to find encryption keys contained within it. Once the keys are found, the attacker can decrypt the remaining data thereby giving the attacker access to sensitive data held in the RAM.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
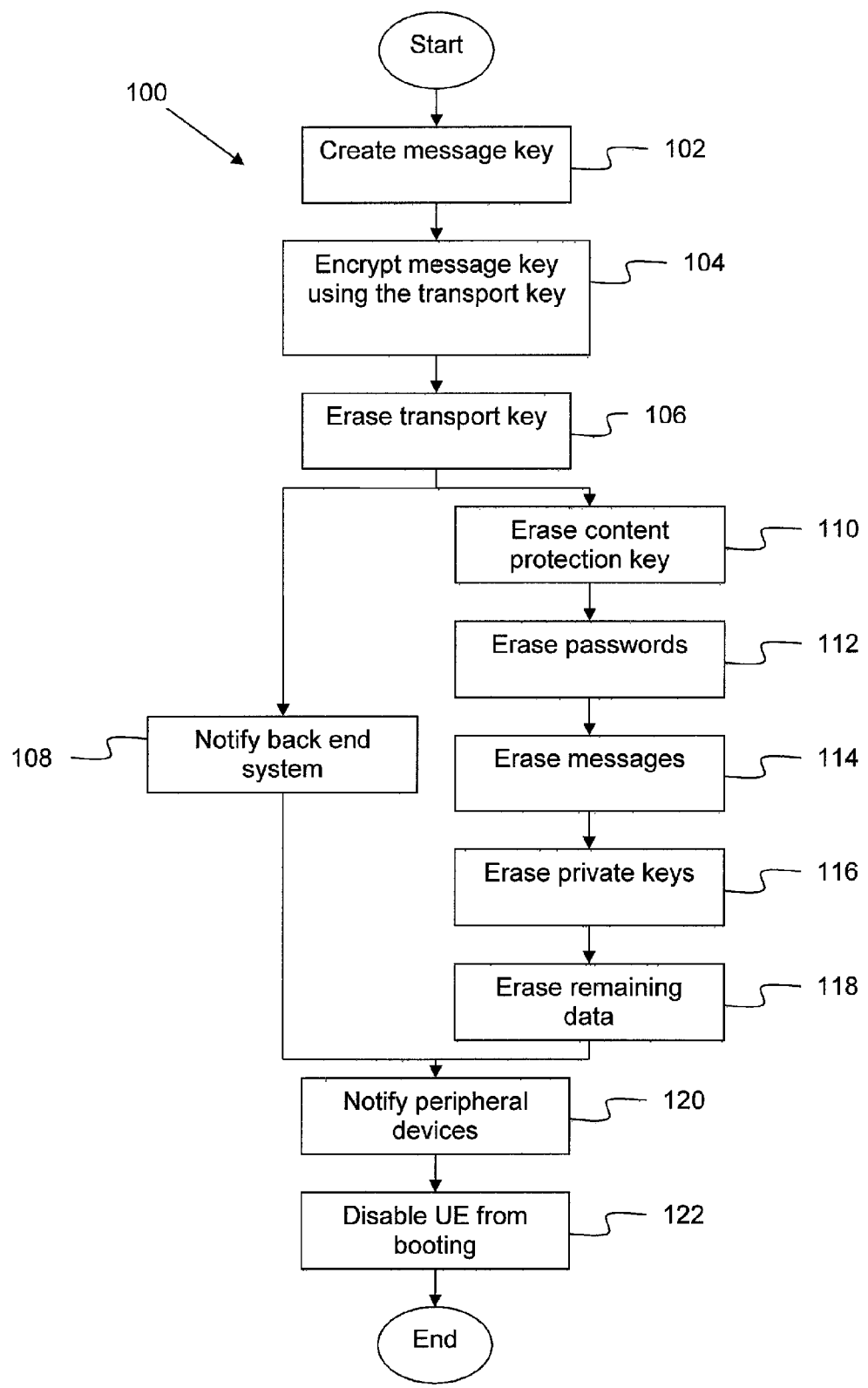
FIG. 1 is a flowchart for a method for hindering a cold boot attack according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A cold boot attack exploits the data remanence property of RAM. This property can be extended by cooling the RAM before turning the UE off. Since the cold boot attack requires cooling certain components, it may be possible to detect a cold boot attack using a temperature sensor. For example, a temperature sensor may be installed within a UE. When the temperature sensor determines that the temperature of one or more memory components (e.g., the RAM) of the UE falls below a threshold, the UE may detect that a cold boot attack is occurring.

Encryption keys are often stored in one or more memory components of a UE. For example, encryption keys may be stored in the RAM of the UE or some other memory component of the UE. Any of these locations are susceptible to cold boot attacks. In an attempt to thwart a cold boot attack, encryption keys may be stored in other locations that make it more difficult for an attacker to access. For example, the encryption keys may be stored in a central processor unit RAM or in a hardware key manager. However, regardless of where encryption keys are stored, a cold boot attack can still be attempted if an attacker gains physical access to a UE.

Thus, in an embodiment, responsive to the detection of a cold boot attack, whether by temperature sensing or otherwise, prioritized security procedures are executed. The prioritized security procedures may include notifying a back end system, securing the UE, notifying any peripheral devices connected to the UE, and disabling the UE from booting.

Securing the UE may comprise erasing encryption keys and data from one or more memory components. In an embodiment, the encryption keys and data are erased from a UE's RAM, flash memory, and/or another memory component that stores sensitive information. The encryption keys and data may be erased from one or more memory components using a number of techniques. For example, the encryption keys and data may be erased by overwriting the memory with zeros. Alternatively, the encryption keys and data may be erased by overwriting the memory with alternating patterns of ones and zeros. Erasing data in such a way is often referred to as wiping the memory. One of ordinary skill in the art will appreciate that other techniques and data patterns may also be used to erase data from memory.

In an embodiment, erasing the encryption keys and data from one or more memory components comprises erasing the transport key, the content protection key, passwords, messages, private encryption keys, and any remaining data. Each of the above mentioned prioritized security procedures will be discussed in greater detail below.

FIG. 1 illustrates a method 100 for hindering a cold boot attack on a UE. Prior to notifying a back end system, which may occur at block 108, block 102 and block 104 are executed. At block 102, a message key or a random session key is created. A message key is designed to protect the integrity of the data within the message. At block 104, the message key is encrypted using a transport key. The transport key already exists on the device and is used to secure communication between the device and the access network. A transport key is designed to protect the integrity of a message key. At block 106, the transport key is erased. Erasing the transport key will prevent the UE from being able to successfully conduct any further communication sessions on the network. This may prevent, for example, malicious attempts to access the communication network and related data.

Next, after the transport key is erased, at block 108, a back end system is notified. For example, a message may be sent to a back end system such as a server. The message may be a text message, an email message, a voicemail message, or some other type of message. In an embodiment, the message comprises an indication that a cold boot attack is occurring on the UE. The message may also comprise a location of the UE that is under attack. The UE may include or have access to a GPS system or a similar system that can determine the location of the UE. In an embodiment, upon receiving the message, the back end system or an administrator manually or automatically disables the account associated with the UE to prevent further breach by the attacker. Also, upon receiving the message, the back end system or an administrator may manually or automatically dispatch security to the location of the UE set forth in the message in an attempt to catch the attacker. Block 108 may be executed concurrently with blocks 110-118.

At block 110, the content protection key is erased. A content protection key is designed to protect the integrity of the data stored on the UE when the UE is locked. For example, the content protection key may encrypt the data stored on the UE when the UE is locked. At block 112, passwords used within the device and/or other passwords used to access the network or services are erased. At block 114, messages are erased. For example, email messages, text messages, voice mail messages, or other types of messages may be erased. At block 116, any private keys on or used by the UE in public/private type security are erased. At block 116, any remaining data on the one or more memory components of the UE is erased. In an embodiment, before erasing the messages and remaining data, the messages and remaining data are sent to a back end system to enable the user of the UE to retrieve such data at a later time.

At block 120, if there are peripheral devices connected to the UE, each peripheral device is notified. For example, a peripheral device such as a smart card reader may be connected to the UE when the cold boot attack is occurring. Upon being notified, each peripheral device may erase encryption keys and clear their memory. Additionally, each peripheral device may disable itself. While block 120 is shown as occurring after blocks 110-118, block 120 could similarly be executed concurrently with notifying the back end system (e.g., block 108).

At block 122, the UE is disabled from ever booting again. For example, in an embodiment, the UE sets a bit in a nonvolatile store in a flash memory that prevents the UE from booting. In such an embodiment, the bit would be checked when the UE is started and the operating system would fail to boot. In some embodiments, in response to detecting a cold boot attack, one or more of blocks 102-122 may be omitted, carried out in a different order than described above, or executed concurrently.

While the above description in regard to FIG. 1 is directed to performing blocks 102-122 in response to the detection of the cold boot attack, some or all of the above blocks could be applied in other contexts as well. For example, blocks 102-122 may be executed when a UE is reported lost or stolen. In an embodiment, when the UE is reported lost or stolen, a back end system sends a message and/or instructions to the UE instructing the UE to take one or more of the steps described above in regard to blocks 102-122. Executing prioritized security procedures in each of these contexts hinders the efforts of the attacker. Specifically, executing prioritized security procedures enables the most sensitive or important information to be erased first thereby reducing the amount of time such sensitive information is available to the attacker.

Figure 2:
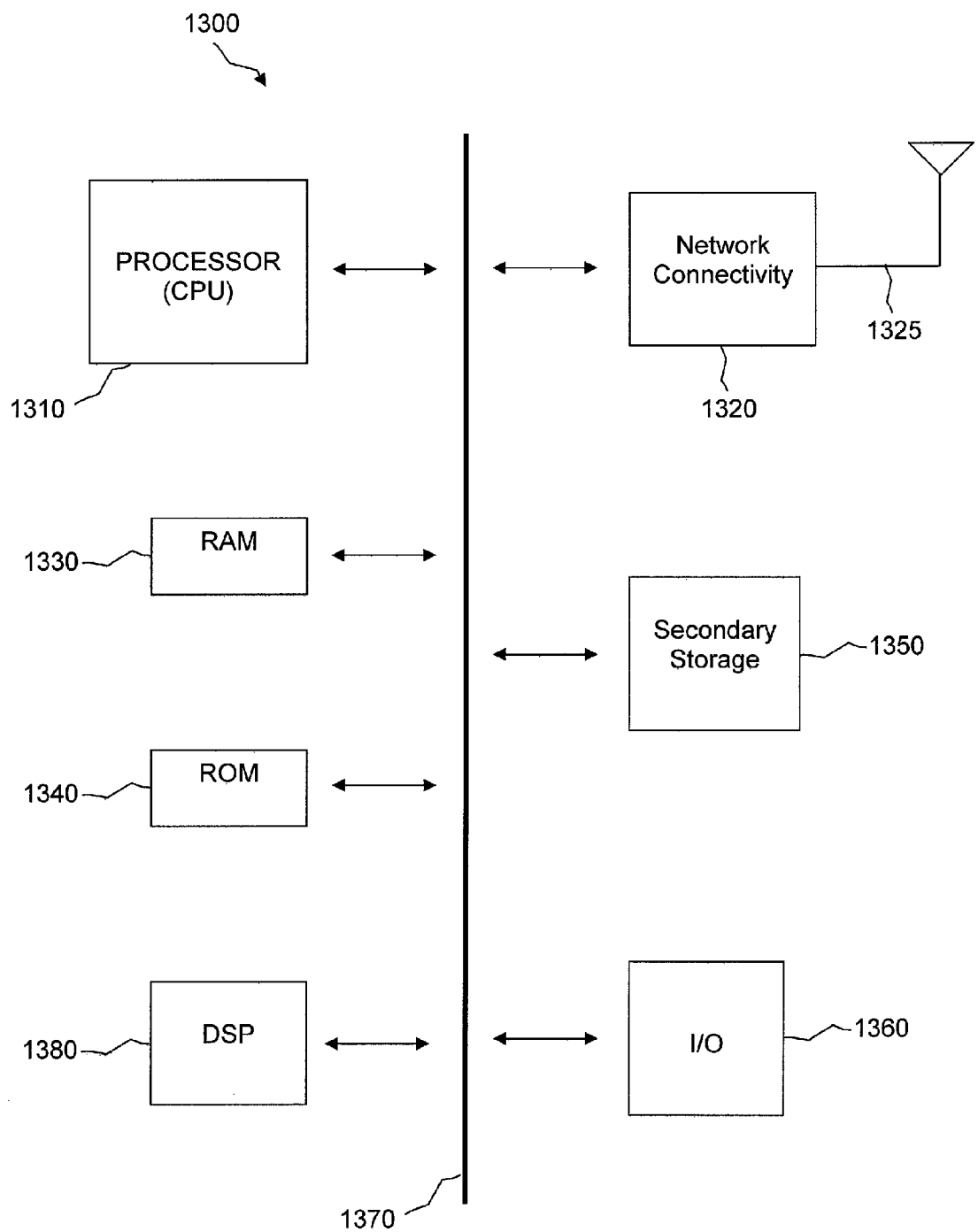
FIG. 2 illustrates a processor and related components suitable for implementing the several embodiments of the present disclosure.

The UE described above might include a processing component that is capable of executing instructions related to the actions described above. FIG. 2 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

In an embodiment, a method for a method for hindering a cold boot attack on a UE is provided. The method comprises, responsive to detection of the cold boot attack, executing prioritized security procedures.

In another embodiment, a UE is provided. The UE comprising a processor configured to execute prioritized security procedures responsive to detection of a cold boot attack.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for hindering a cold boot attack on a user equipment (UE), wherein the UE comprises a processor configured to implement the method, the method comprising:
   in response to determining that a temperature of one or more memory components of the UE fall below a threshold, executing prioritized security procedures, wherein the prioritized security procedures comprise:
   creating a message indicating a vulnerability to a cold boot attack on the UE;
   encrypting the message using a transport key stored on the UE;
   erasing the transport key in response to encrypting the message, thereby preventing the UE from conducting subsequent secure communication sessions on a network; and
   notifying a back end system by sending the encrypted message to the back end system, in response to erasing the transport key.

2. The method of claim 1, wherein the prioritized security procedures comprise securing the UE.

3. The method of claim 2, wherein securing the UE comprises, in response to erasing the transport key, erasing one or more of a content protection key, passwords, messages, private keys, and remaining data.

4. The method of claim 3, wherein the erasing is prioritized to be executed in the following order: the content protection key, the passwords, the messages, the private keys, and the remaining data.

5. The method of claim 3, wherein the notifying the back end system is executed concurrently with the erasing of one or more of the content protection key, the passwords, the messages, the private keys, and the remaining data.

6. The method of claim 1, wherein the message further comprises a location of the UE.

7. The method of claim 2, wherein the prioritized security procedures further comprises notifying one or more peripheral devices connected to the UE to enable the one or more peripheral devices to erase keys and data stored on the one or more peripheral devices.

8. A user equipment (UE), comprising:
   a temperature sensor; and
   memory storing instructions executable by a processor and configured such that when executed, cause the processor to execute prioritized security procedures responsive to the temperature sensor detecting that a temperature of one or more memory components of the UE fall below a threshold, wherein the prioritized security procedures comprise:
   creating a message indicating a vulnerability to a cold boot attack on the UE;
   encrypting the message using a transport key stored on the UE;
   erasing the transport key in response to encrypting the message, thereby preventing the UE from conducting subsequent secure communication sessions on a network; and
   notifying a back end system by sending the encrypted message to the back end system, in response to erasing the transport key.

9. The UE of claim 8, wherein the prioritized security procedures comprise securing the UE.

10. The UE of claim 9, wherein the prioritized security procedures further comprise notifying one or more peripheral devices connected to the UE and disabling the UE from booting.

11. The UE of claim 10, wherein the notifying one or more peripheral devices connected to the UE and the disabling the UE from booting are executed subsequent to the notifying the back end system and the securing the UE.

12. The UE of claim 9, wherein the securing the UE comprises, in response to erasing the transport key, erasing a content protection key, passwords, messages, private keys, and remaining data.

13. The UE of claim 12, wherein the erasing is prioritized to be executed in the following order: the content protection key, the passwords, the messages, the private keys, and the remaining data.

14. The UE of claim 12, wherein the notifying the back end system is executed concurrently with the erasing of one or more of the content protection key, the passwords, the messages, the private keys, and the remaining data.

15. The UE of claim 8, wherein the message to the back end system comprises a location of the UE.

* * * * *